(12) United States Patent
Dent (10) Patent No.: US 6,904,150 B1
(45) Date of Patent: Jun. 7, 2005

(54) CRYPTOGRAPHIC METHOD AND SYSTEM FOR DOUBLE ENCRYPTION OF MESSAGES

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 920 days.

(21) Appl. No.: 09/696,141

(22) Filed: Oct. 25, 2000

(51) Int. Cl.[7] .................................................. H04L 9/00

(52) U.S. Cl. ............................ 380/28; 380/30; 714/752

(58) Field of Search .............................. 380/28, 30, 37, 380/268–269; 714/747, 751–753, 755, 758

(56) References Cited

U.S. PATENT DOCUMENTS 5,703,948 A * 12/1997 Yanovsky .................... 380/262

OTHER PUBLICATIONS

Schneier, B., Applied Cryptography, 1996, John Wiley & Sons, Inc., 2nd Edition, pp. 41–44, 466–74.*

Computer Dictionary, 1997, Microsoft Press, 3rd Edition, pp. 122–123.*

* cited by examiner

Primary Examiner—Gilberto Barron
Assistant Examiner—Minh Dinh
(74) Attorney, Agent, or Firm—Coats & Bennett P.L.L.C.

(57) ABSTRACT

A method and system for encrypting and decrypting a message. A message is created by appending an error detection code to an information block. The binary value of the resulting message is then compared to the sender's encryption modulus. If the binary value of the message is greater than or equal to the sender's encryption modulus, at least one bit of the error detection code is altered to reduce the binary value of the message below the sender's encryption modulus. The potentially modified message is then encrypted once using the sender's private key to generate a once encrypted message referred to herein as the signed message. The signed message is then encrypted using the recipient's public key to produce a doubly encrypted bitstring. The recipient deciphers and decodes the doubly encrypted bitstring. If an decoding failure occurs, the recipient assumes that the error is due to an intentional bit change by the sender and attempts to restore the presumably altered bit or bits to their presumed original value.

27 Claims, 4 Drawing Sheets

CRYPTOGRAPHIC METHOD AND SYSTEM FOR DOUBLE ENCRYPTION OF MESSAGES

BACKGROUND OF THE INVENTION

The present invention relates to cryptographic methods and, more particularly, to a method for signing and encrypting messages using keys with different moduli.

Encryption is the process of disguising intelligible information, called plaintext, to hide its substance from eavesdroppers. Encrypting plaintext produces unintelligible data called ciphertext. Decryption is the process of converting ciphertext back to its original plaintext. Using encryption and decryption, two parties can send messages over an insecure channel without revealing the substance of the message to eavesdroppers.

A cryptographic algorithm or cipher is a mathematical function used in the encryption and decryption of data. Many cryptographic algorithms work in combination with a key to encrypt and decrypt messages. The key, typically a large random number, controls the encryption of data by the cryptographic algorithm. The same plaintext encrypts to different ciphertext with different keys. In general, it is extremely difficult to recover the plaintext of a message without access to the key, even by an eavesdropper having full knowledge of the cryptographic algorithm.

One type of cryptographic algorithm, known as public key algorithms, use different keys for encryption and decryption. An encryption key, also called the public key, is used for encrypting data and is accessible to other users. Anyone can use the public key to encrypt messages. A decryption key, also called the private key, is kept secret and is used to decrypt messages. Only a person with the private key can decrypt messages encrypted with the corresponding public key. During use, the sender encrypts a message using the public key of the intended recipient. Only the intended recipient can decipher the message using his private key. Since the private key is not distributed, public key algorithms avoid the problems of key exchange inherent in symmetric algorithms.

One of the most popular public key algorithms is the RSA algorithm, named after its three inventors—Ron Rivest, Adi Shamir, and Leonard Adleman. The RSA algorithm takes a message M and encrypts it using the formula $C=M^E \mod N$, where N is the product of two large prime numbers P, Q chosen at random. The exponent E is a number relatively prime to (P-1)(Q-1). The encrypted message C is deciphered using the formula $M=C^D \mod N$ where $D=E^{-1} \mod ((p-1)(q-1))$. The exponent E and modulus N are used as the public key. The exponent D is the private key. The primes P and Q are not needed once the public and private keys have been computed but should remain secret.

The RSA algorithm, and other public key algorithms, allow secure communications between two parties, but do not provide a means for authenticating the parties. When a person receives a message encrypted with his public key, he can be assured that the content of the encrypted message is secret, since only he possesses the key for decrypting the message. However, the party receiving the encrypted message has no assurance of the identity of the sending party, since anyone with his public key could have encrypted the message.

If the receiving party desires to authenticate the sending party's identity, the sending party may sign the message by encrypting it with his private key. The receiving party can then use the sender's public key to decrypt the message. If the message is decrypted successfully, only the sending party in possession of the private key could have sent that message. This process of authenticating the message by encryption using the sender's private key is referred to as signing.

It is known to doubly encrypt messages to provide both secure communications and authentication capability. In this case, each party to the communication possesses a public key used for encrypting messages and a private key used for decrypting messages. Assume that party A wishes to send party B a message. Party A encrypts the message first, using party A's private key. The resulting ciphertext is encrypted a second time, using party B's public key. The result of these second encryption operations is transmitted to party B. Party B decrypts the message using party B's private key. Since party B is the only person in possession of the private key, only he can decrypt the message, so the communication is secure. The result of the first decryption operation is the inner ciphertext produced by encrypting the original message with party A's private key. Thus, party B can then use party A's public key to decrypt the inner ciphertext to obtain the original message. Since only party A possesses the private key that can generate the inner ciphertext, party A's identity is authenticated to party B.

When using the RSA algorithm for encryption, the message M is broken into blocks such that the length of each message block is less than the encryption modulus. The reason for breaking the message into blocks having a length less than the encryption modulus is to avoid loss of data. A similar procedure is typically used when a message is to be signed using the sender's private key and then encrypted using the recipient's public key. In this case, the message M is partitioned into blocks of a fixed length one or more bits less than the binary length of a first encryption modulus, which is used in the signing operation. The output of the signing operation is a sequence of blocks equal to the length of the first encryption modulus. The blocks output during the signing operation are recombined and repartitioned to form input blocks of a fixed length one or more bits less than the length of a second encryption modulus associated with the receipient's public key. The resulting message blocks are then encrypted using the recipient's public key. This procedure avoids loss of data by ensuring that the numerical value of each message block is less than the encryption modulus used during the signing or encryption operations.

BRIEF SUMMARY OF THE INVENTION

The present invention is directed to a method of signing and encrypting messages using encryption keys having different moduli. A message is created by appending an error detection code to an information block. The binary value of the resulting message is then compared to the sender's encryption modulus. If the binary value of the message is greater than or equal to the sender's encryption modulus, at least one bit of the error detection code is altered to reduce the binary value of the message below the sender's encryption modulus. The potentially modified message is then encrypted once using the sender's private key to generate a once encrypted bitstring referred to herein as the signed message. The signed message is then encrypted a second time using the recipient's public key to produce a doubly encrypted bitstring referred to herein as the encrypted message.

The recipient deciphers the encrypted message, i.e., doubly encrypted bitstring, using the recipient's private key to recover the signed message, i.e., once encrypted bitstring.

The signed message comprises the original plaintext message encrypted to the sender's private key. The signed message is then deciphered using the sender's public key to obtain an estimate of the original plaintext of the message.

Following decryption, a validity check is performed by first decoding the estimate of the message in a decoder. If decoding is successful, the estimate is accepted as valid. If decoding produces an error, it is possible that the error is due to a change in a bit of the error detection code by the sender. Therefore, a bit alteration check is performed to determine whether change of a predetermined and presumably altered bit to its presumed original value produces a valid message. If so, the restored message is accepted as valid.

If the first estimate cannot be validated, a second estimate of the original plaintext message is generated and the process validation process is repeated. The second estimate is generated by adding the recipient's modulus to the once encrypted message and deciphering the modified once encrypted message to obtain a new estimate of the plaintext message. This process continues until a valid message is produced or until a predetermined number of failed attempts to produce a valid message have been made.

DETAILED DESCRIPTION OF THE INVENTION

Figure 1:
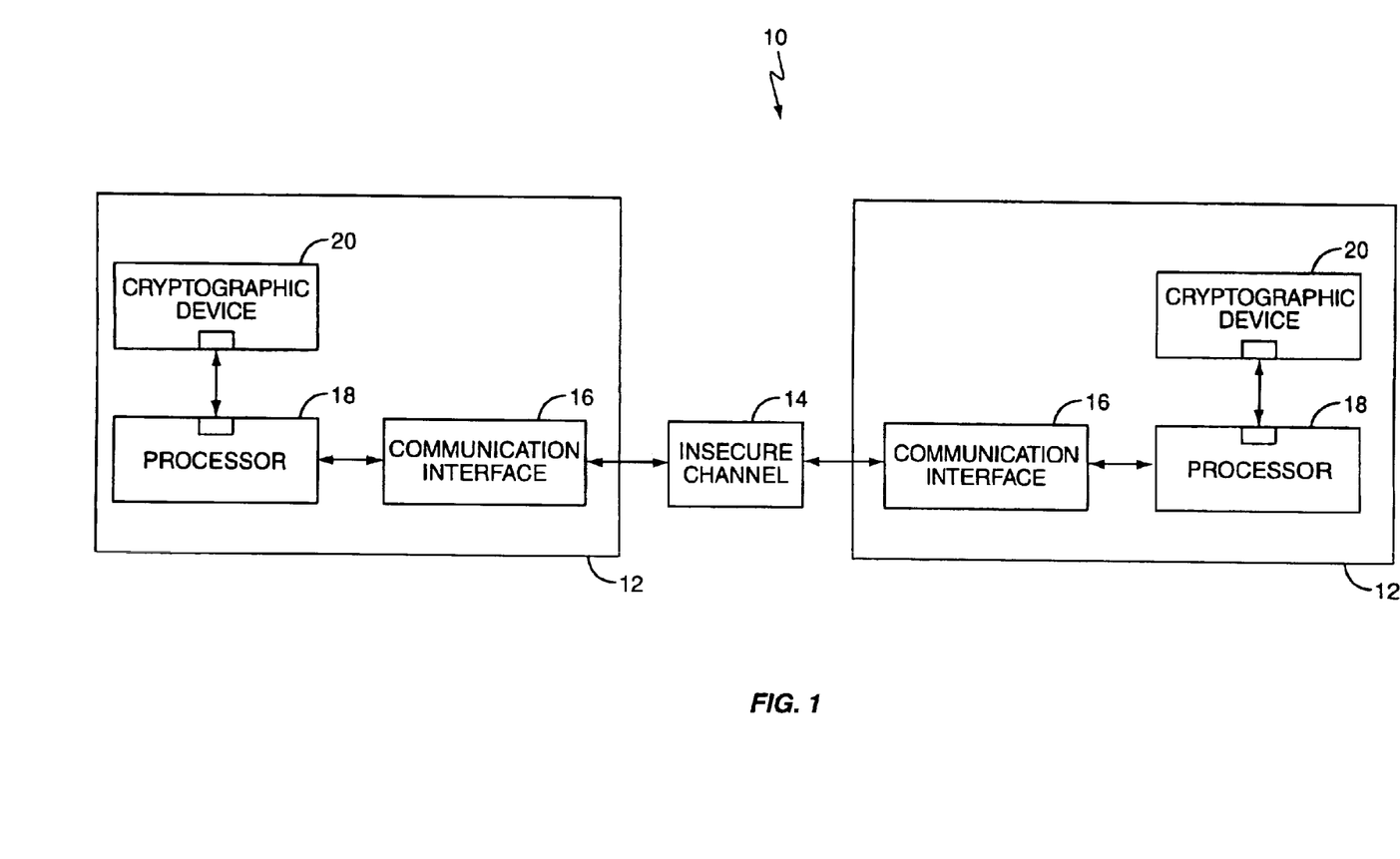
FIG. 1 is a schematic diagram of a cryptographic communication system comprising two cryptographic communication devices used in the present invention for engaging in secure communications over a communications channel.

FIG. 1 illustrates a schematic diagram of a cryptographic communication system 10 for transmitting and receiving encrypted messages over an insecure channel. The cryptographic communication system 10 includes two or more communication devices 12 for communicating over an insecure channel 14. Although only two communication devices 12 are illustrated, the communication system 10 may in fact comprise numerous communication devices 12.

The term "communication device" used herein refers to any device capable of transmitting and/or receiving information over a communication channel 14. The communication channel 14 may be a wireline channel or a wireless channel. Communication devices may include: a cellular radiotelephone; a Personal Communications System (PCS) terminal that may combine a cellular radiotelephone with data processing, facsimile and data communications capabilities; a Personal Digital Assistant (PDA) that can include a radiotelephone, pager, Internet/intranet access, Web browser, organizer, calendar and/or a global positioning system (GPS) receiver. The term communication device also encompasses computing devices, such as a personal computer, laptop computer, or palmtop computer, that includes a communications interface for communicating with other devices. Communication interfaces used in computing devices 12 may for example comprise an Ethernet interface, serial interface, modem, radiotelephone transceiver, or any other interface typically used in a computer to communicate with other devices.

Each communication device 12 includes a communications interface 16, processor 18, and a cryptographic device 20. Processor 18 controls the operation of the communication device 12 and may include either internal or external memory for storing control programs and data used during operation. Processor 18 may further perform some computational functions during the encryption and decryption steps of the communication. Processor 18, however, may not be a secure device such that data stored therein may be accessed by outside parties.

Cryptographic device 20 is typically a secure, tamper-proof device that includes a processor and memory used for cryptographic calculations, e.g. encryption and decryption. Cryptographic device 20 may for example comprise a "smart card" or tamper-proof chip. Data computed and stored within the cryptographic device 20 cannot be accessed by an outside source thus providing security for the ciphering process. The cryptographic device 20 stores encryption variables, such as public and private keys, used in ciphering algorithms to encrypt and decrypt data. The encryption variables may be generated internally in the cryptographic device 20 to prevent the possibility of tampering or disclosure. While shown in FIG. 1 as a separate device, the function of the cryptographic device 20 may in fact be incorporated into processor 18.

Communication interface 16 provides a means for interfacing the communications device 12 with the communications channel 14. Interface 16 may have a variety of embodiments, including a radio frequency transceiver, Ethernet interface, modem, etc.

Figure 2:
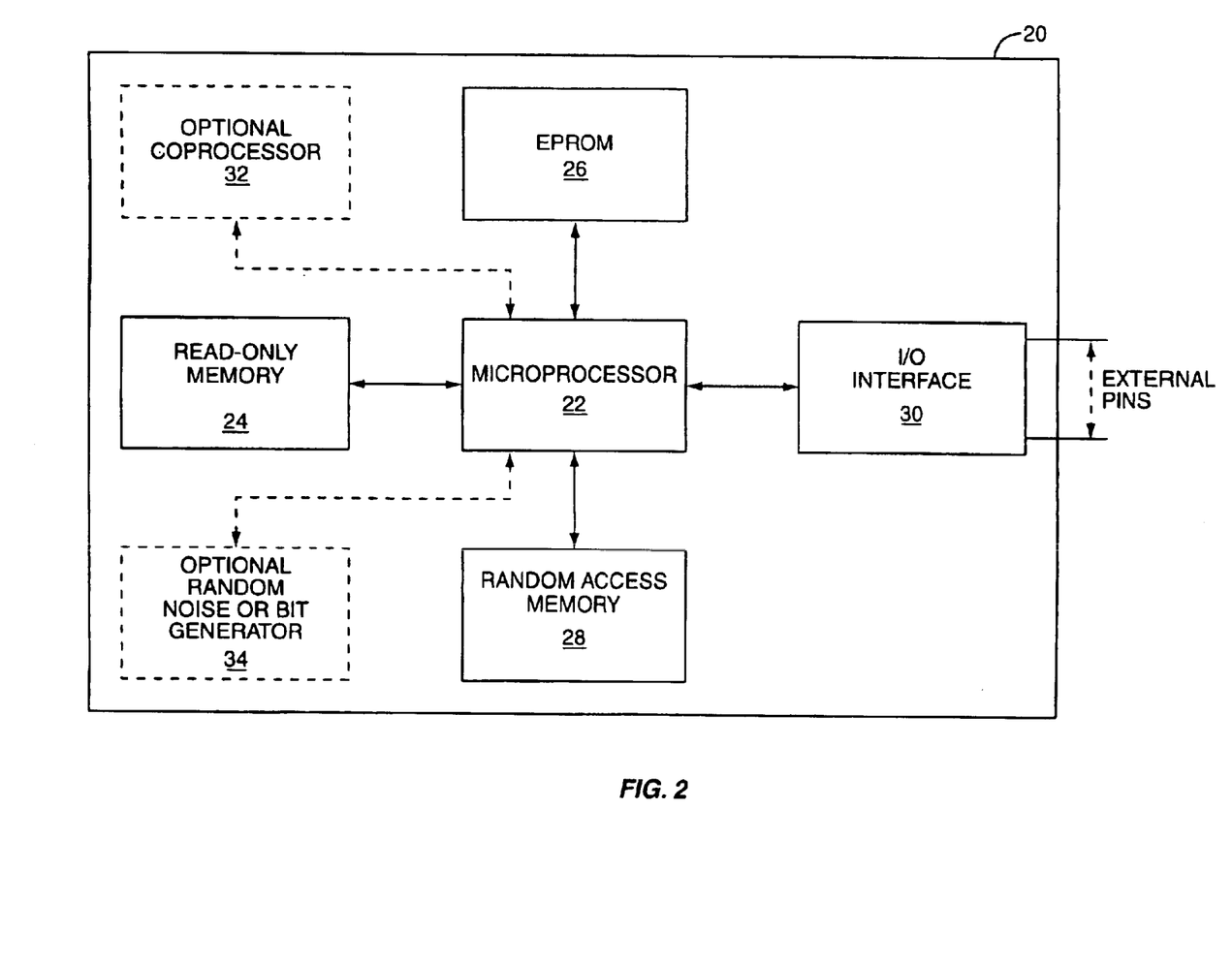
FIG. 2 is a schematic diagram of a cryptographic communication device used in the present invention.

FIG. 2 is a more detailed block diagram of a cryptographic device 20. Cryptographic device 20 comprises microprocessor 22, read-only memory 24, erasable programmable read-only (EPROM) 26, random access memory (RAM) 28, input/output (I/O) interface 30, optional co-processor 32, and encoder/decoder 34. The microprocessor 22 executes programs stored in read-only memory 24 and responds to digital codes presented to the microprocessor 22 on I/O interface 30. The digital codes presented to the microprocessor 22 represent commands to be executed by the microprocessor 22. There are only a limited set of valid commands that may be executed by the microprocessor 22. Valid commands include, for example, requests to encipher or decipher data presented on the I/O interface 30 and to return the result as output bits on the I/O interface 30. Encryption and decryption may be performed using internally stored or externally supplied keys. When encryption is performed using a stored, long-term secret key, such as the private key of a public/private key pair, it is generally desirable that the encryption operation be performed internally by the microprocessor 22 and one or more co-processors in order to obviate the need for the secret key to be output to an external or off-chip device. In that case, there will be no legal command to request output of the private key to which the microprocessor 22 will respond. Thus, there may be, if necessary, a co-processor 32 to accelerate computations of the sort necessary using public key encryption methods based on very large prime numbers.

Read-only memory 24 stores programs that are executed by microprocessor 22 and its co-processors, if present. The programs stored in read-only memory 24 determine the legal commands. Read-only memory 24 is, typically, factory programmed. The programs stored therein are unalterable to prevent tampering.

EPROM 26 stores user-specific data or other data that must be field programmed. This includes the user's identity certificate and public-key/private-key pair and the associated modulus. The public key may be a relatively small, comprising one to eight decimal digits. The public key is typically published in a catalog or database along with the encryption modulus and user's identity. The encryption modulus is typically a large number in the order of 2048 bits (256 bytes) in length and the private key is of the same order of word length. The public key, encryption modulus, and private key are initially stored in EPROM 26 but, during initialization, the public key and encryption modulus are erased from memory.

The private key may be modified during the initialization process to eliminate random digits corresponding to a user's PIN code. The modified private key, for example, may have some missing digits which have to be filled in by the user to complete the private key. For example, two bytes of the private key could be left blank and the missing 16 bits grouped to form a 4-digit, hexadecimal PIN code, e.g., 5C1F. A related U.S. patent application entitled "Secure Storage of Ciphering Information Using a PIN Code," which is being filed concurrently with this application, describes a method for storing encryption data in a tamper-proof chip or "smart card." This application is incorporated herein in its entirety by reference.

Encoder/decoder 34 performs error encoding and decoding. Error encoding allows bit errors that occur during transmission to be detected by the recipient. An information sequence to be transmitted is encoded, for example, by computing a cyclic redundancy check (CRC) code, which is appended to the information sequence. At the receiving end, the CRC is computed on the received information bits and compared to the received CRC bits to determine the number and location of bit errors. Encoder/decoder 34 and bit alteration detector 36 are described in detail below.

The present invention comprises a cryptographic method implemented by a cryptographic communication device 12 for encrypting and decrypting transmitted information. The cryptographic method employs public key encryption and decryption techniques to encrypt and decrypt transmitted information to protect the transmitted information from disclosure. There are numerous public key algorithms suitable for use with the present invention. One such public key algorithm is known as the RSA algorithm, which is used herein to describe an exemplary embodiment of the invention. The RSA algorithm is described in U.S. Pat. No. 4,405,829, which is incorporated herein by reference.

The RSA algorithm and other public key algorithms use a first key, called the public key, for encryption operations and a corresponding second key, called the private key, for decryption operations. A message encrypted with the public key can be decrypted only with the private key. Therefore, to engage in secure communications, the sender encrypts the message using the recipient's public key so that only the intended recipient can decipher the message using the corresponding private key.

Another useful property of the RSA algorithm, and other public key algorithms, is that a message encrypted with a private key can also be decrypted with the corresponding public key. Thus, it is possible for a sender to "sign" a message prior to transmission by encrypting the message with his own private key. The recipient can authenticate or verify the "signature" by deciphering the message with the sender's public key. If the message is successfully deciphered with the sender's public key, the sender's "signature" on the message is authenticated. For purposes of this application, encryption with a private key is referred to as signing. The resulting ciphertext is referred to as a "signature."

According to the present invention, both the sender and receiver have a public/private key pair used for encrypted communications. The sender's key pair is denoted ($K_{PRIVA}$, $K_{PUBA}$). The recipient's key pair is denoted ($K_{PRIVB}$, $K_{PUBB}$). The sender's key pair ($K_{PRIVA}$, $K_{PUBA}$) is based on a first encryption modulus denoted $N_A$ while the recipient's key pair ($K_{PRIVB}$, $K_{PUBB}$) is based on a second encryption modulus denoted $N_B$. To avoid the common modulus attack and other known security weaknesses, the sender's encryption modulus $N_A$ and the recipient's encryption modulus $N_B$ are assumed to be different. In one embodiment, the sender's modulus $N_A$ and the recipient's encryption modulus $N_B$ are the same length, and both have a "1" in the most significant and least significant bit positions. These conditions ensure that the modulus $N_A$ cannot exceed the modulus $N_B$ by a factor of two or more. A message M is signed first using the sender's private key $K_{PRIVA}$ and then encrypted using the recipient's public key $K_{PUBB}$. The resulting doubly encrypted message is then transmitted to the recipient.

In the exemplary embodiment, the message M comprises an information block and one or more redundant bits. The information block may comprise one or more information bits embodying the substance of the message. The redundant bits may for example comprise error detection bits generated by error detection coding the information block. In the case where the redundant bits are error detection bits, the recipient can use the error detection bits to detect bit errors occurring during transmission. The redundant bits and information bits are referred to collectively as message bits.

The total number of message bits is, in the exemplary embodiment, equal to the number of bits in sender's encryption modulus $N_A$. Choosing the message length to be equal to the word length of modulus $N_A$ reduces the number of information blocks that must be encrypted. There is, however, a possibility that the numerical value of the message M may equal or exceed the sender's encryption modulus $N_A$. This possibility is avoided in the present invention by altering at least one message bit in a deterministic manner, known to the recipient, prior to encryption to reduce the numerical value of the message M when the numerical value of the message M equals or exceeds the sender's encryption modulus $N_A$. A validity check is performed during decryption to detect and correct any bit changes made by the sender.

Figure 3:
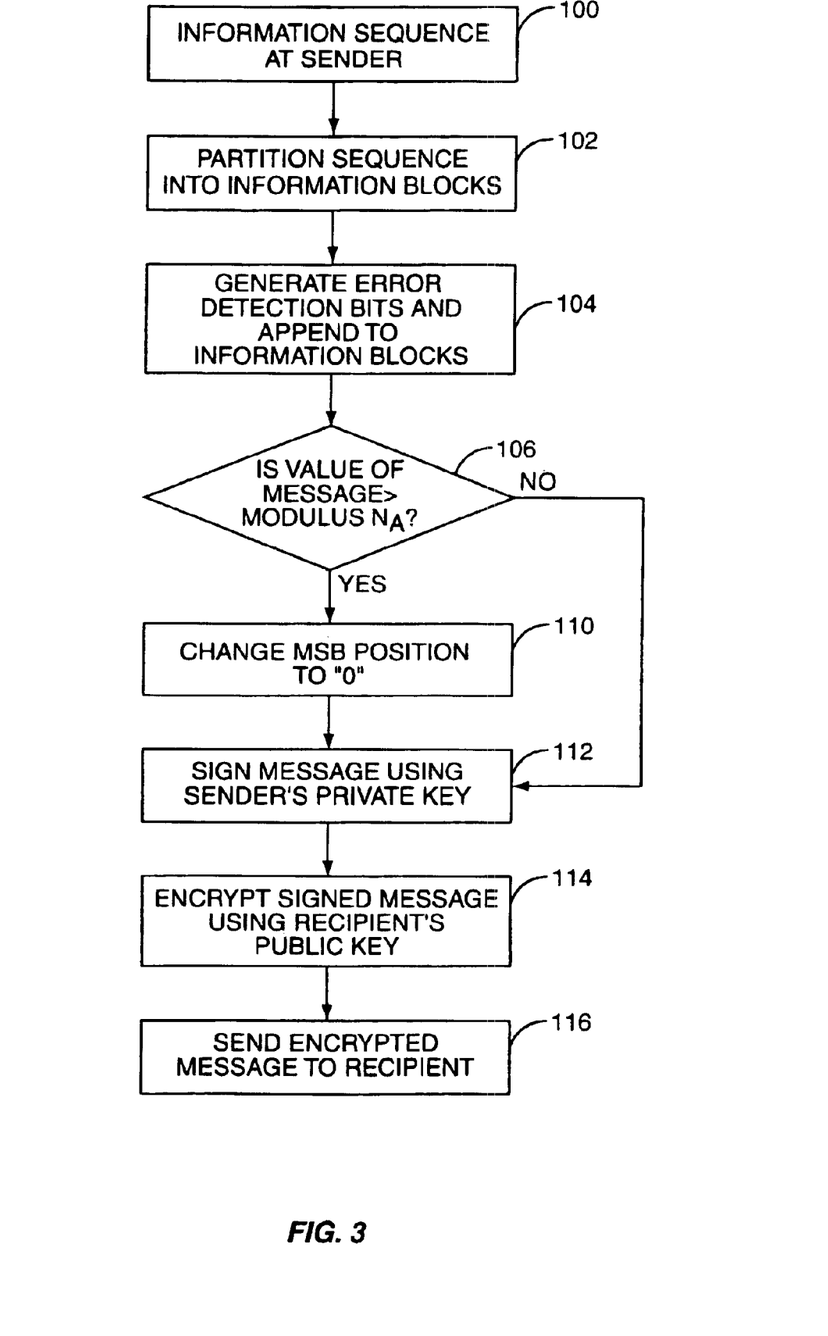
FIG. 3 is a flowchart diagram illustrating the steps of encrypting a message in accordance with one embodiment of the present invention.

FIG. 3 illustrates the cryptographic communication method of the present invention. The sender generates or receives an information sequence (block 100), which the sender desires to send to the recipient. The information sequence is assumed to be in digital form and may comprise any alphanumeric, audio, or graphic presentation of any length. The sender partitions the information sequence into one or more information blocks (block 102). Each information block is transmitted separately to the recipient in the following manner. First, the sender performs error detection coding on the information block to generate one or more error detection bits and appends the error detection bits to the information block at step 104 to create a message M. The error detection bits are used by the recipient to verify that the message M has been correctly deciphered. The error detection code may, for example, comprise a cyclic redundancy check (CRC), in which case the error detection bits are the resulting CRC bits. In the exemplary embodiment, the error detection bits are inserted into the information block with one error detection bit occupying the most significant bit (MSB) position in the message M. The error detection bits may simply be appended to the end of the information block such that the error detection bits are contiguous and occupy the most significant bit positions. Alternately, the error detection bits can be interleaved with the information bits in the information block.

Prior to encrypting the message M, a check is made to determine whether the numerical or binary value of the message M is equal to or greater than the sender's modulus $N_A$ (block 106). If the numerical value of message M is equal to or greater than the sender's encryption modulus $N_A$, the message M would be reduced during the encryption operation by subtraction of the modulus $N_A$ resulting in data loss. Therefore, when message M is greater than the sender's modulus $N_A$, the bit occupying the MSB position is changed to 0 (block 110). This ensures that modulus $N_A$ has a greater numerical value and that data will not be lost during the encryption operation. The possibly modified message M is then signed using the sender's private key $K_{PRIVA}$ and encryption modulus $N_A$ (block 112) to create a once encrypted bitstring. If the RSA algorithm is used, encryption is performed using the equation $Y=M^{Kpriva} \mod N_A$, where Y is the signed message. The signed message Y is encrypted at step 114 using the recipient's public key $K_{PUBB}$ and encryption modulus $N_B$ to create a doubly-encrypted bitstring. Again, if the RSA algorithm is used, the encryption operation is performed using the $Z=Y^{Kpubb} \mod N_B$ where Z is the encrypted message. The encrypted message Z is then transmitted by the sender to the recipient (block 116).

Figure 4:
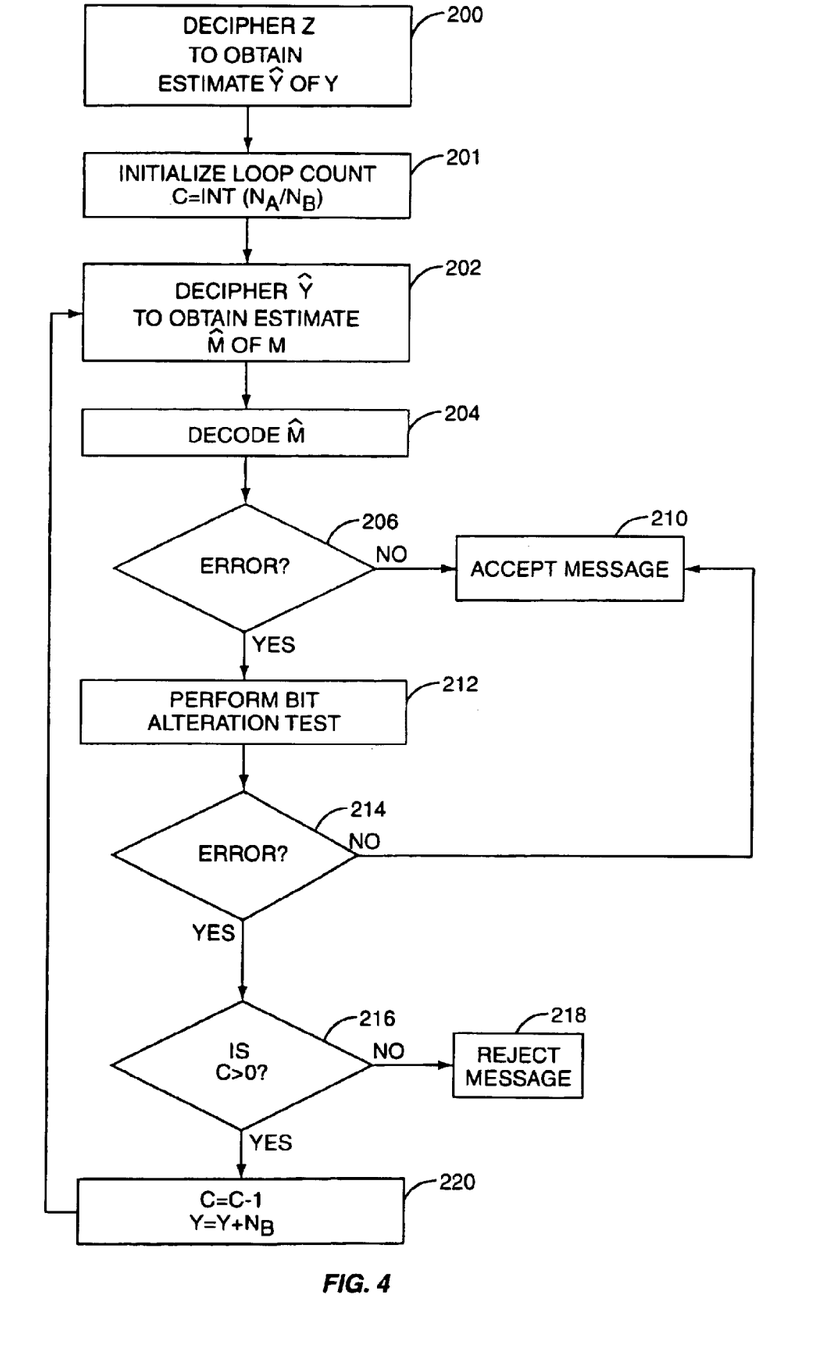
FIG. 4 is a flowchart diagram illustrating the steps of decrypting the message in accordance with one embodiment of the present invention.

FIG. 4 illustrates the steps involved with deciphering the encrypted message Z to recover the message M. Initially, the encrypted message Z is deciphered using the recipient's private key $K_{PRIVB}$ to obtain an estimate $\hat{Y}$ of the signed message Y (block 200). Mathematically, this is obtained through the formula $\hat{Y}=Z^{PRIVB} \mod N_B$. A counter C is then initialized to be the integer value of $N_A/N_B$ (block 201), which is necessary to track the number of decoding failures as will be explained below. C will be zero if $N_A < N_B$. C will be unity if $N_A > N_B$ but $N_A$ and $N_B$ are of the same length. Next, the recipient deciphers the estimate $\hat{Y}$ of the signed message Y using the sender's public key $K_{PUBA}$ to obtain a first estimate $\hat{M}$ of the original message M (block 202). This estimate is obtained through the formula $\hat{M}=Y^{PUBA} \mod N_A$.

Once the first estimate of message $\hat{M}$ is obtained, the recipient error decodes the first estimate $\hat{M}$ by encoder/decoder 34 to determine if any bit errors occurred during transmission (block 204). Encoder/decoder 34 initially decodes the estimate $\hat{M}$ to detect any bit errors. Error decoding may comprise, for example, performing a CRC check. If the estimate $\hat{M}$ decodes properly (block 206), the estimate $\hat{M}$ is assumed to be the correct value of M (block 210). If error decoding fails, i.e. an invalid CRC is produced, a bit alteration check is performed by the bit alteration detector 36. It is possible that the decoding failure is due to the alteration by the sender of the MSB to reduce the numerical value of the message M below the value of modulus $N_A$. Since the alteration by the sender occurs in a deterministic manner, encoder/decoder 34 attempts to restore the presumably altered bit to its presumed original value to generate a modified estimate $\overline{M}$ of the original message M. The purpose of the bit alteration detector 36 is to determine whether the modified estimate $\overline{M}$ is valid.

The modified estimate $\overline{M}$ of the message M is accepted if three conditions are satisfied: (1) M contains a single bit error at a predetermined bit location; (2) the value of the altered bit in the predetermined bit location has an expected value, i.e., it is consistent with the error detection code being indicative of no errors; and (3) the numerical value of a modified estimate $\overline{M}$ of message M is equal to or greater than the modulus $N_A$. These conditions are tested during a bit alteration check by bit alteration detector 36 in block 212. In the exemplary embodiment, the only permitted bit change is the most significant bit (MSB), but this limitation is not required. Therefore, the bit alteration detector 36 determines whether this bit is in error and whether any other bit errors occurred. If the MSB is correct, or if more than one bit error occurred, an error signal is generated by encoder/decoder 34 (block 214). Assuming that the first condition is met, encoder/decoder 34 determines if the bit in the MSB position is "0". The MSB may have been altered by the sender prior to encryption to ensure that value of the message M is less than the sender's modulus $N_A$ (see block 106 in FIG. 3). If the MSB is a "1", then encoder/decoder 34 generates an error signal (block 214), since the error is not due to an intentional bit change which would always comprise a change from a 1 to a 0. Finally, if the first two conditions are met, encoder/decoder 34 changes the MSB from "0" to "1" and the value of the modified estimate $\overline{M}$ is compared to the sender's modulus $N_A$. If the modified estimate $\overline{M}$ is greater than or equal to $N_A$, it is determined that the message M was modified during enciphering and the modified estimate $\overline{M}$ with the MSB restored to its presumed original value is a reproduction of the original message M (block 210). However, if a decoding failure occurs, an error signal is generated (block 214). In this case, additional steps are required.

Another potential cause of a decoding failure occurs when the sender's modulus $N_A$ is greater than the recipient's modulus $N_B$. During the signing step (block 112 in FIG. 3), the value of the original signed message Y is in the range of 0 to $N_A-1$. Thus, when $N_A > N_B$, it is possible for the numerical value of the signed message Y to exceed $N_B-1$. In this case, the signed message Y would be reduced to a value less than $N_B$ during encryption by subtraction of modulus $N_B$. In the practice of the present invention, it is accepted that the value of the signed message Y may be reduced by subtraction of the recipient's modulus $N_B$ or an integer multiple of the recipient's modulus $N_B$. To account for this occurrence, the value of the estimate $\hat{Y}$ of the signed message Y is increased by the recipient's modulus $N_B$ (block 220) when there is a decoding failure. Before incrementing the estimate $\hat{Y}$ of the signed message, the count C is compared to a predetermined value, which in this case is 0. The count C was initialized to a the integer value of $N_A/N_B$, which represents the maximum number of times that the signed message Y could have been reduced. Each time the value of the estimate $\hat{Y}$ of the signed message Y is incremented, the loop count is decreased by one (block 220). The second deciphering step (block 202) is repeated to obtain a new estimate $\hat{M}$ of the message M, which is then decoded by encoder/decoder 34 (block 204) to determine the presence of bit errors. If so, a bit error check is performed (block 212) to determine whether the original message M was changed by the sender. This process is repeated until the counter reaches 0 or until a valid estimate M is obtained.

In one embodiment, $N_A$ and $N_B$ have different values, but are of the same binary length, e.g. 2048 bits. Additionally, both moduli $N_A$ and $N_B$ are odd, meaning both have a binary value of "1" in the MSB and a least significant bit (hereinafter LSB) position. This implies that $N_A/N_B$ is less than two. Thus, when the signed message Y is greater than $N_B-1$ at most only one $N_B$ is subtracted. In this case, the maximum number of times that the signed message Y can be incremented is 1 and the deciphering step 202 is repeated only once. In general, the maximum number of times Y may be incremented is equal to the integer value $N_A/N_B$, which is used to initialize the counter.

The present invention may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for enciphering an information sequence for subsequent transmission comprising:

creating an original message by adding a redundant bit to said information sequence at a most significant bit position;

comparing a numerical value of said original message to a predetermined value;

if the numerical value of said original message is equal to or greater than said predetermined value, changing at least one bit in said original message to obtain a modified message having a numerical value less than said predetermined value by changing said redundant bit at said most significant bit position; and encrypting said modified message with a key associated with a first modulus.

2. The method of claim 1 wherein comparing a numerical value of said original message to a predetermined value comprises comparing said numerical value of said original message to said first modulus.

3. The method of claim 2 wherein changing at least one bit in said original message to obtain a modified message having a numerical value less than said predetermined value further comprises changing at least one bit in said original message such that the numerical value of said modified message is less than said first modulus.

4. The method of claim 1 wherein creating an original message by adding one or more bits to said information sequence comprises adding one or more error detection bits to said information sequence.

5. The method of claim 4 wherein adding one or more error detection bits to said information sequence comprises computing a cyclic redundancy check code and appending said cyclic redundancy check code to said information sequence.

6. The method of claim 1 wherein encrypting said modified message with a key associated with a first modulus comprises encrypting said modified message with a private key based on said first modulus to obtain a signed modified message.

7. The method of claim 6 further comprising encrypting said signed modified message with a key associated with a second modulus less than said first modulus to obtain an encrypted modified message.

8. The method of claim 7 further comprising deciphering said encrypted modified message to obtain a first estimate of said modified message.

9. The method of claim 8 further comprising validating said first estimate of said modified message.

10. The method of claim 9 wherein validating said first estimate of said modified message comprises:

error decoding said first estimate of said modified message using one or more error detection bits to generate an error indication;

if said error indication indicates no error, accepting said first estimate of said modified message as a reproduction of said original message;

if said error indication indicates an error, altering at least one predetermined bit in said first estimate of said modified message to obtain a modified estimate of said modified message; and validating said modified estimate of said modified message.

11. The method of claim 10 wherein validating said modified estimate of said modified message comprises performing a bit alteration check to determine whether a predetermined bit of said modified message is an altered bit.

12. The method of claim 11 wherein performing a bit alteration check to determine whether a predetermined bit of said modified message is an altered bit comprises:

determining whether bit errors occurred in said at least one predetermined bit;

if bit errors occurred in said at least one predetermined bit, determining whether the value of said at least one predetermined bit has an expected value; and if said at least one predetermined bit has an expected value, determining whether said modified estimate of said modified message has an expected value.

13. The method of claim 12 wherein determining whether bit errors occurred in said at least one predetermined bit comprises determining whether a bit error occurred in a most significant bit.

14. The method of claim 13 wherein determining whether the value of said at least one predetermined bit has an expected value comprises determining whether said most significant bit is equal to zero.

15. The method of claim 14 wherein determining whether said modified estimate of said modified message has an expected value comprises determining whether said modified estimate with said most significant bit position equal to one is greater than or equal to said encryption modulus.

16. A method of encrypting a message comprising the steps of:

forming an original message by appending one or more redundant bits to an information sequence;

comparing a value of said original message with a value of a first modulus and modifying said original message to obtain a modified message if said original message is greater than or equal to said first modulus;

signing said modified message with a first key based on said first modulus to form a signed message;

encrypting said signed message with a second key based on a second modulus to form a doubly encrypted message;

sending said doubly encrypted message to a recipient; and wherein said original message has a length equal to said first modulus.

17. The method of claim 16 wherein signing said modified message with a first key based on said first modulus to form a signed message comprises signing said modified message with a sender's private key.

18. The method of claim 16 wherein modifying said original message to obtain a modified message if said original message is greater than or equal to said modulus comprises changing the value of one of said redundant bits.

19. The method of claim 16 wherein forming an original message by appending one or more redundant bits to an information sequence comprises adding error detection bits computed on said information sequence to said information sequence.

20. A method of deciphering a doubly encrypted bitstring comprising:
  deciphering said doubly encrypted bitstring to obtain a once encrypted bitstring;
  deciphering said once encrypted bitstring to obtain a first estimate of a plaintext message having one or more error detection bits;
  decoding said first estimate of said plaintext message to produce a first error indication;
  if said first error indication indicates an error, performing a bit alteration check to determine whether a predetermined bit in said first estimate of said plaintext message was altered;
  modifying said once encrypted bitstring if said bit alteration check produces an error by adding a predetermined value to said once encrypted bitstring, said predetermined value equal to a modulus associated with an encryption key used to generate said doubly encrypted bitstring;
  deciphering said modified once encrypted bitstring to obtain a second estimate of said plaintext message;
  decoding said second estimate of said plaintext message to produce a second error indication;
  if said second error indication indicates an error, performing another bit alteration check to determine whether a predetermined bit in said second estimate of said plaintext message was altered.

21. The method of claim 20 wherein performing a bit alteration check to determine whether a predetermined bit in said first estimate of said plaintext message was altered comprises altering a predetermined bit in said first estimate of said plaintext message to generate a modified plaintext message and testing the validity of said modified plaintext message.

22. The method of claim 20 wherein performing a bit alteration check to determine whether a predetermined bit in said first estimate of said plaintext message was altered comprises checking said first estimate of said plaintext message for a bit error in a predetermined bit position.

23. The method of claim 22 wherein performing a bit alteration check to determine whether a predetermined bit in said first estimate of said plaintext message was altered further comprises determining a value of a bit in said predetermined bit position.

24. The method of claim 23 wherein performing a bit alteration check to determine whether a predetermined bit in said first estimate of said plaintext message was altered further comprises altering said value of said bit in said predetermined bit position to obtain a modified estimate of said plaintext message and comparing a value of said modified estimate of said plaintext message to a predetermined value.

25. A method of deciphering a doubly encrypted bitstring comprising:
  deciphering said doubly encrypted bitstring to obtain a once encrypted bitstring;
  modifying said once encrypted bitstring by adding an integer multiple of a modulus associated with an encryption key used to generate said doubly encrypted bitstring to said once encrypted bitstring to obtain a modified once-encrypted bitstring;
  deciphering said modified once encrypted bitstring to obtain an estimate of said plaintext message.

26. The method of claim 25 further comprising decoding said estimate of said plaintext message to produce an error indication.

27. The method of claim 26 further comprising performing a bit alteration check to determine whether a predetermined bit in said estimate of said plaintext message is an altered bit, if said error indication indicates an error.

* * * * *